(12) United States Patent
Sohn et al.

(10) Patent No.: US 8,830,208 B2
(45) Date of Patent: Sep. 9, 2014

(54) MULTI TOUCH FLAT DISPLAY MODULE

(75) Inventors: Min Ho Sohn, Paju-si (KR); Jong Seong Choi, Anyang-si (KR); Hyung Uk Jang, Seongnam-si (KR); Sang Rae Lee, Gyeongju-si (KR); Sang Hyuck Bae, Seoul (KR); Byung Chun Yu, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 690 days.

(21) Appl. No.: 12/243,750

(22) Filed: Oct. 1, 2008

(65) Prior Publication Data
US 2009/0128508 A1    May 21, 2009

(30) Foreign Application Priority Data
Nov. 19, 2007    (KR) ................ P2007-118085

(51) Int. Cl.
*G06F 3/042* (2006.01)

(52) U.S. Cl.
CPC .................. *G06F 3/0421* (2013.01); *G06F 2203/04109* (2013.01)
USPC ............................................ 345/175; 345/173

(58) Field of Classification Search
USPC ................................................. 345/173, 175
See application file for complete search history.

(56) References Cited

U.S. PATENT DOCUMENTS

| | | | | |
|---|---|---|---|---|
| 6,969,189 B2* | 11/2005 | Lee et al. | ............... | 362/631 |
| 7,490,963 B2* | 2/2009 | Fang et al. | ............... | 362/330 |
| 2005/0184964 A1* | 8/2005 | Liao et al. | ............... | 345/173 |
| 2007/0211205 A1* | 9/2007 | Shibata | ............... | 349/161 |
| 2008/0011944 A1* | 1/2008 | Chua et al. | ............... | 250/227.24 |
| 2008/0029691 A1* | 2/2008 | Han | ............... | 250/224 |
| 2008/0055261 A1* | 3/2008 | Cernasov | ............... | 345/173 |
| 2008/0055494 A1* | 3/2008 | Cernasov | ............... | 349/12 |
| 2008/0158185 A1* | 7/2008 | Westerman | ............... | 345/173 |
| 2009/0128499 A1* | 5/2009 | Izadi et al. | ............... | 345/173 |
| 2010/0001962 A1* | 1/2010 | Doray et al. | ............... | 345/173 |

FOREIGN PATENT DOCUMENTS

| | | |
|---|---|---|
| JP | 2007-156023 A | 6/2007 |
| JP | 2007-156648 A | 6/2007 |
| KR | 10-2006-0012959 A | 2/2006 |

OTHER PUBLICATIONS

Bob Mesnik, "Trigonometry Solutions in Surveillance applications or why I shouldn't have slept through that class", Sep. 2007, <http://web.archive.org/web/20070920174416/http://www.imakenews.com/kin2/e_article000682060.cfm?x=b8v5FDQ,b25tl0b3,w>.*

Kim et al., "HCI (Human Computer Interaction) Using Multi-touch Tabletop Display"; Communications, Computers and Signal Processing, 2007, IEEE Xplore-PACRIM'07, pp. 391-394, 1-4244-1190-4/07.

(Continued)

*Primary Examiner* — Sumati Lefkowitz
*Assistant Examiner* — Jose Soto Lopez
(74) *Attorney, Agent, or Firm* — Birch, Stewart, Kolasch & Birch, LLP

(57) ABSTRACT

A display module including a touch panel configured to be touched so as to input information, a liquid crystal display panel disposed below the touch panel and configured to display the information to be touched on the touch panel, a plurality of emitting light units configured to emit infrared light formed in at least two sides of the touch panel, a plurality of image sensors disposed below the liquid crystal panel and configured to detect infrared rays redirected through the liquid crystal panel towards the image sensors based on a touching of the touch panel, and a controller configured to determine a portion of the touch panel that is touched based on signals received from the plurality of image sensors.

12 Claims, 10 Drawing Sheets

(56) References Cited

OTHER PUBLICATIONS

Smith et al.; "Low-Cost Malleable Surfaces with Multi-Touch Pressure Sensitivity"; Horizontal Interactive Human-Computer Systems, 2007. Tabletop '07; Second Annual IEEE International Workshop; pp. 205-208.

* cited by examiner $$c = 0.25 \times \sqrt{a^2+b^2} \times \tan\left(\frac{\pi-\theta}{2}\right)$$

Sensor 1  Sensor 2  Sensor 3  Sensor 4

MULTI TOUCH FLAT DISPLAY MODULE

This application claims the benefit of the Korean Patent Application No. P2007-118085, filed on Nov. 19, 2007, which is hereby incorporated by reference as if fully set forth herein.

BACKGROUND OF THE INVENTION

1. Field of the Invention

The present invention relates to a flat display module, and more particularly, to a multi-touch flat display module capable of accurately determining coordinate values and determining when the flat display module is simultaneous touched a multiple number of times.

2. Discussion of the Related Art

Touch panels are now used in a variety of devices and allow a user to input information by simply touching an icon or area defined on the touch panel. For example, cell phones, Personal Digital Assistants (PDAs), computers, vending machines, various medical equipment, etc. now use touch panels. Many business and government agencies also use kiosks including touch panels that the user can touch to input or request information. Navigation systems provided in vehicles or cell phones also use touch panels.

However, the related art touch panels are limited in nature and allow the user to only input one selection at a time. Thus, the user must often input several commands in a time-consuming sequential manner. Further, it is often difficult to accurately determine the coordinates of the touch panel where the user has touched.

SUMMARY OF THE INVENTION

Accordingly, one object of the present invention is to address the above-noted and other drawbacks.

Another object of the present invention is to provide a multi touch flat display module and corresponding electronic device including the display module capable of determining accurate coordinate values of touched spots of a touch panel, and also capable of recognizing several spots simultaneously touched.

To achieve these and other advantages and in accordance with the purpose of the present invention, as embodied and broadly described herein, the present invention provides in one aspect a display module including a touch panel configured to be touched so as to input information, a liquid crystal display panel disposed below the touch panel and configured to display the information to be touched on the touch panel, a plurality of emitting light units configured to emit infrared light formed in at least two sides of the touch panel, a plurality of image sensors disposed below the liquid crystal panel and configured to detect infrared rays redirected through the liquid crystal panel towards the image sensors based on a touching of the touch panel, and a controller configured to determine a portion of the touch panel that is touched based on signals received from the plurality of image sensors.

In another aspect, the present invention provides a method of controlling a touch panel including a liquid crystal display panel disposed below the touch panel. The method includes displaying information to be touched on the touch panel, emitting infrared light formed in at least two sides of the touch panel, detecting infrared rays redirected through the liquid crystal panel via image sensors disposed below the liquid crystal panel based on a touching of the touch panel, and determining a portion of the touch panel that is touched based on signals received from the plurality of image sensors.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this application, illustrate embodiment(s) of the invention and along with the description serve to explain the principle of the invention. In the drawings.

DETAILED DESCRIPTION OF THE INVENTION

Figure 1:
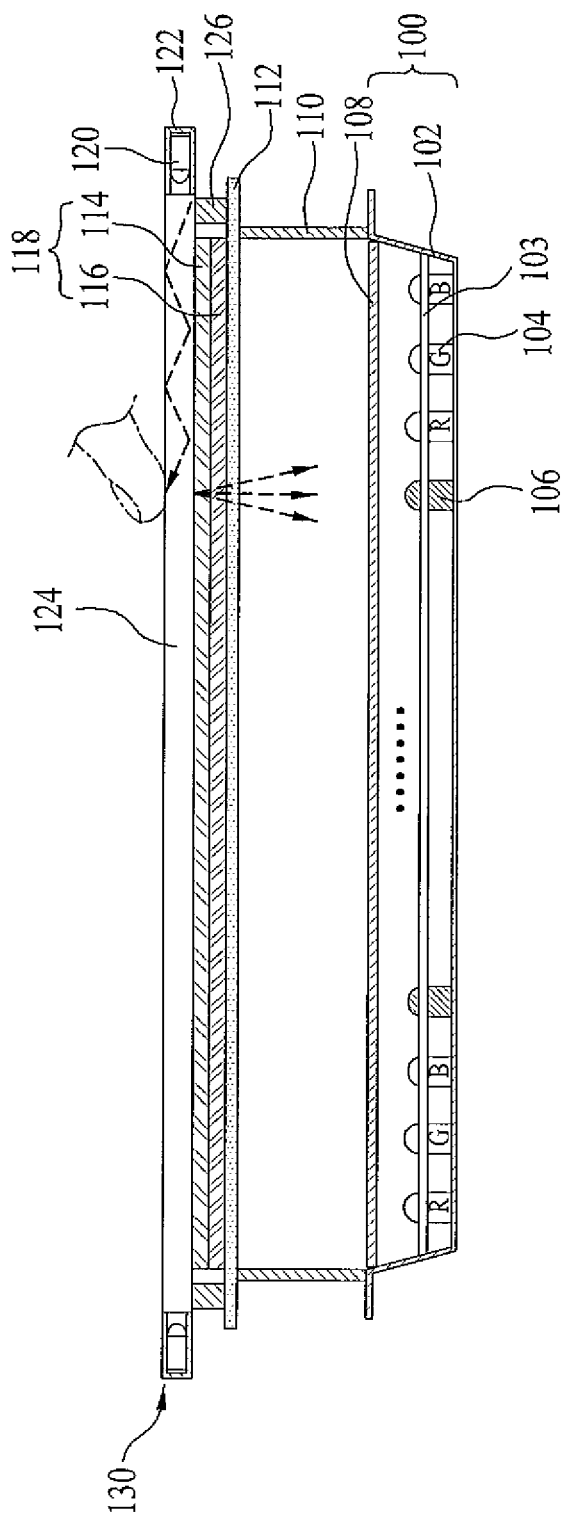
FIG. 1 is a cross-sectional view illustrating a multi touch flat display module according to an embodiment of the present invention.

Reference will now be made in detail to the preferred embodiments of the present invention, examples of which are illustrated in the accompanying drawings. Wherever possible, the same reference numbers will be used throughout the drawings to refer to the same or like parts.

Touch panels can be classified according to their recognition methods. In particular, touch panels can be classified into a resistive type touch panel, a micro capacitive touch glass, an ultrasonic wave touch glass, and an infrared type touch panel.

The resistive type touch panel includes two transparent conductive layers in which a lower layer includes glass or plastic coated with a conductive material and an upper layer includes a film coated with a conductive material. Further, the two layers are electrically insulated by maintaining a predetermined interval between the two layers using a fine printed spacer. In addition, a predetermined voltage is applied to the two layers coated with the conductive material.

Thus, when a user touches the upper layer using his or her finger or using a stylus, pointer, touch pen, etc., a variation of resistance occurs at the upper layer corresponding to an X-axis and the lower layer corresponding to a Y-axis at the touched position. Further, a controller calculates the positions on the X-axis and the Y-axis, where the resistance values are varied, to determine where the user touched the touch panel.

In addition, the micro capacitive touch glass includes a transparent glass sensor thinly coated with a conductive material. The conductive coating layer also includes printed electrode patterns along an edge of the conductive coating layer. A protection coating made of transparent glass is also applied in close contact with an upper side of the conductive layer to protect and enclose the glass sensor.

The micro capacitive touch glass operates in such a manner that a predetermined voltage is applied to a glass screen and the electrode patterns form a low voltage field on a surface of the touch sensor through the conductive layer. Therefore, when the user touches the screen with his or her finger, etc., a micro-amperage current is generated at the touched spot. Further, because the current from each corner is proportional to a distance from the corner to the fingers touched spot, a controller can determine the touched spot through proportional calculations using the amperage of the current.

In addition, the ultrasonic wave touch glass is made totally of glass. Therefore, compared to other touch screens, in which the lifespan can be reduced via even minor scratches or abrasions on the surface, the ultrasonic wave touch glass is not as influenced by surface damage or abrasion. Further, in the ultrasonic wave touch glass, a controller transmits 5 MHz of electric signals to a transmitting transducer which generates ultrasonic waves.

The generated ultrasonic waves are then passed through a panel surface by reflected lines. Therefore, when the user touches a surface of the touch screen, a part of the ultrasonic waves passing through the touched spot are absorbed by the user, and loss of signals are transmitted to the controller through received signals and a digital map. The controller then calculates the coordinate values of the spots where the variation of the signals occurs. The above serial operations are performed with respect to the X-axis and the Y-axis, separately.

Further, the infrared type touch panel uses the straightness effect of infrared rays, that is, uses a principle in that infrared rays do not advance beyond an obstacle placed ahead of the rays. In more detail, infrared rays emitted in horizontal and vertical directions are obstructed at a spot touched by the user, and a controller determines the coordinate values of the X-axis and Y-axis of the infrared-obstructed spot.

Thus, the infrared type touch panel detects the touched spot through interruption of the infrared ray at a front side of the touch panel. Further, infrared rays are emitted from one side of the X-axis and the Y-axis and received at the other side of the X-axis and the Y-axis, thereby forming an invisible infrared grid.

Hereinafter, the preferred embodiments of the present invention will be described with reference to the Figures. In more detail, the present invention uses a display panel such as a liquid crystal display panel in combination with infrared light emitting units and image sensors configured to receive redirected light rays based on a user touching a touch panel.

In more detail, the present inventors advantageously determined that the transmittance of the infrared LEDs using a wavelength greater than 850 nm sufficiently pass through a display panel (e.g., a liquid crystal display panel) such that the liquid crystal display panel can be used in a touch panel. That is, the advancing directions of the infrared rays from the infrared light emitting elements having greater than 850 nm wavelength are reflected and transmitted through the display panel, such that the image sensors can detect the infrared rays. The use of a liquid crystal display panel is particularly advantageous, because the liquid crystal display panel can clearly display images even at different viewing angles, different lighting conditions, etc. Liquid crystal display panels can also simply the manufacturing process of touch panels and reduce the overall costs of the touch panels.

Turning next to FIG. 1, which is a cross-sectional view illustrating a multi touch flat display module according to an embodiment of the present invention.

As shown in FIG. 1, the multi touch flat display module includes a display panel 118 showing an image therethrough, infrared light emitting diodes (LEDs) 120 emitting infrared rays from at least two sides of the display panel 118, and a light guide panel 124 performing total reflection of the infrared rays emitted from the infrared LEDs 120 such that the emitted infrared rays travel across the surface of the light guide panel 124 (see the dotted line arrow in the panel 124).

Also includes are image sensors 106 which detect infrared rays redirected because of a frustrated total internal reflection (FTIR) by the light guide panel 124 being touched, and therefore transmitted through the display panel 118. A bottom cover 102 receiving the image sensors 106 and the light sources 104 are also included as well as a side frame 110 disposed at an upper part of the bottom cover 102 to expand a measurable range of the infrared rays transmitted through the display panel 118, and a transparent transmissive plate 112 supporting the display panel 118 at an upper part of the side frame 110.

In addition, the touch panel also includes a spacer 126 maintaining a gap for the display panel 118 between the light guide panel 124 and the transparent transmissive plate 112. Further, the display panel 118 includes a lower substrate 116 and an upper substrate 114 adhered to each other. The display panel 118 may also include a liquid crystal panel, a field emission panel, a plasma display panel, or an organic light emitting display panel.

Also, when the display panel 118 is the liquid crystal panel, the upper substrate 114 includes a color filter, a common electrode, and a black matrix. The common electrode may also be provided at the lower substrate 116. A liquid crystal layer (not shown) is also formed between the upper and the lower substrates 114 and 116.

Further, the lower substrate 116 includes a plurality of intercrossed data lines, a plurality of gate lines, thin film transistor (TFT) formed on each pixel areas defined by the pluralities of data lines and gate lines, and a pixel in connection with the TFT.

In addition, the TFT supplies the pixel with an image signal from the data line in response to a gate pulse from the gate line. Also included is a common electrode allowing the pixel to function as a liquid crystal capacitor. In addition, the pixel includes a storage capacitor for storing the image signal supplied to the liquid crystal capacitor until another image signal is applied.

The multi touch flat display module also includes a touch part 130 at an upper part of the display panel 118 and a transparent transmissive plate 112 at a lower part of the display panel 118. The touch part 130 includes the light guide panel 124, an outer frame 122 and the infrared LEDs 120.

Further, in one embodiment, the light guide panel 124 covers the entire upper surface of the display panel 118 and totally reflects the infrared rays emitted from the infrared LEDs 120. Thus, when the touch panel module is touched, the light guide panel 124 converts an advancing direction of the infrared rays from the infrared LEDs 120 due to the FTIR caused by the touch and totally reflects the infrared rays to the lower part of the light guide panel 124 where the display panel 118 is disposed.

In addition, the FTIR means that the infrared rays from the infrared LED 120, advanced and totally reflected within the light guide panel 124, are redirected toward the lower part of the light guide panel 124 upon the external touch on the light guide panel 124. The light guide panel 124 may also be formed of plastic material such as polymethyl methacrylate (PMA), resin, or heat-resistant glass.

Figure 3:
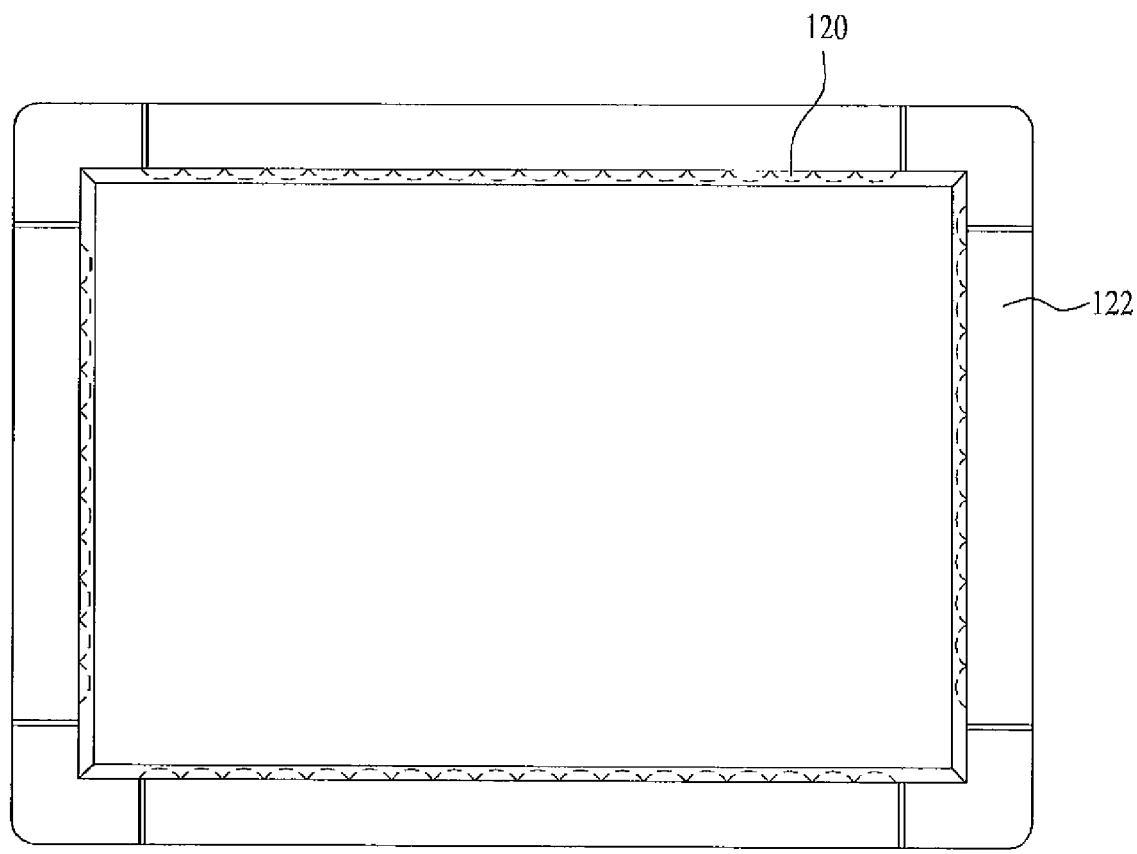
FIG. 3 is an overview illustrating an arrangement of infrared light emitting diodes (LEDs) mounted to a multi touch flat display module according to a first embodiment of the present invention.
Figure 5:
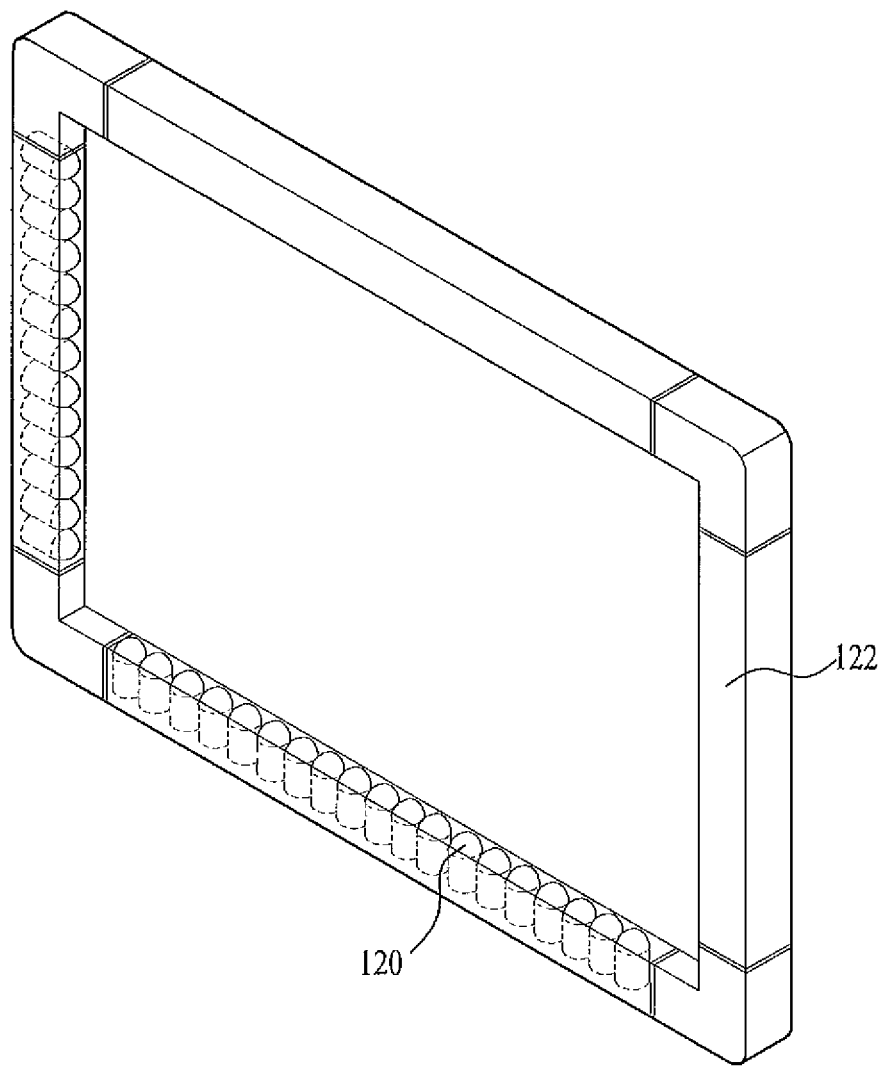
FIG. 5 is an overview illustrating infrared LEDs mounted to a multi touch flat display module according to a second embodiment.
Figure 6:
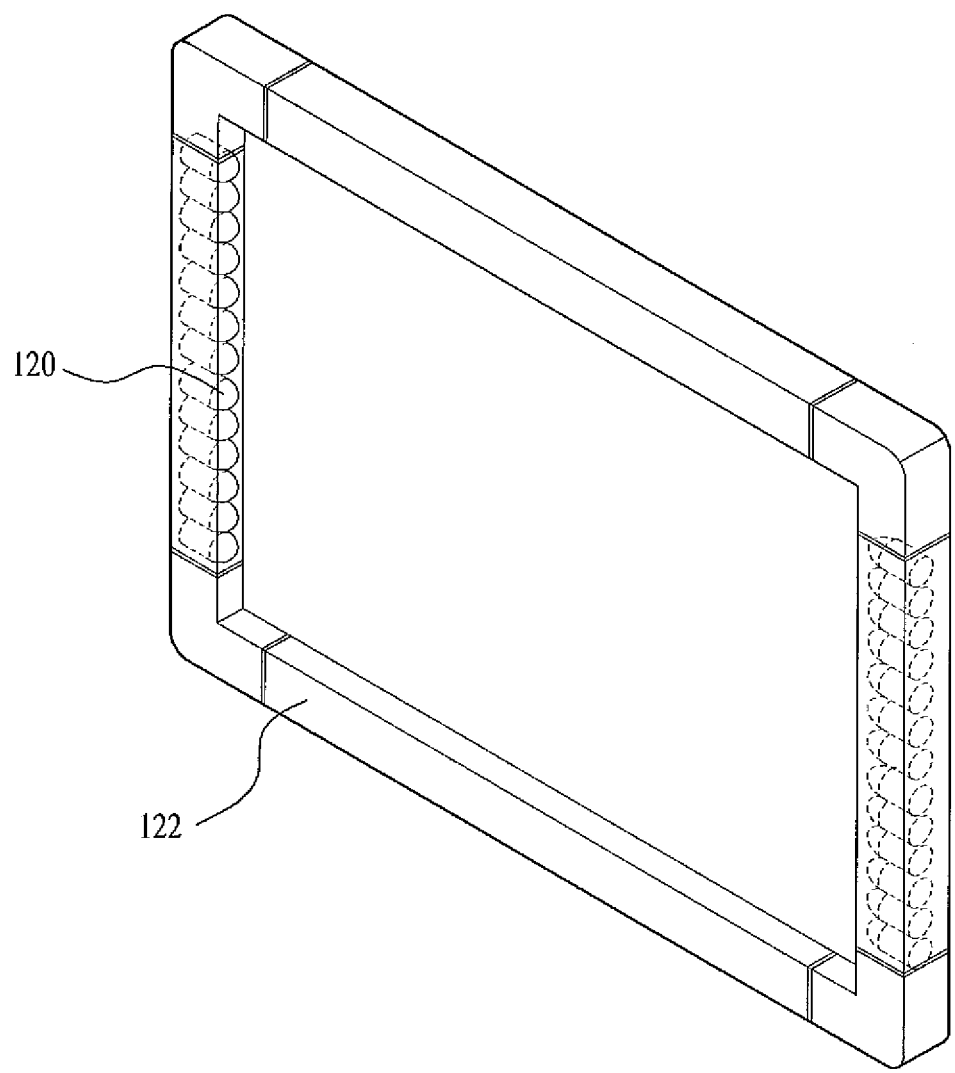
FIG. 6 is an overview illustrating infrared LEDs mounted to a multi touch flat display module according to a third embodiment.

Further, as shown in FIGS. 3, 5, and 6, the outer frame 122 is formed along an outer circumference of the light guide panel 124. More specifically, the outer frame 122 is installed such that the infrared LEDs 120 can emit infrared rays into the light guide panel 124.

Also, as shown in FIG. 3, a plurality of the infrared LEDs 120 may be mounted at each side of the outer frame 122. In this instance, the plurality of infrared LEDs 120 emit infrared rays from each side of the outer frame 122 such that the emitted rays are guided or travel within the light guide panel 124 (see FIG. 1) so as to enable a controller to detect spots touched by a user. The advancing directions of the infrared rays emitted from the infrared LEDs 120 are converted to the lower part of the display panel 118 owing to the FTIR phenomenon.

Thus, according to a first embodiment of the present invention as shown in FIG. 3, the infrared LEDs 120 are mounted to all four sides of the outer frame 122 to enhance recognizing performance. However, according to a second embodiment shown in FIG. 5, the infrared LEDs 120 may be provided to one long side and one short side of the outer frame 122.

In a third embodiment as shown in FIG. 6, the infrared LEDs 120 may be mounted to the outer frame 122 only on the short sides of the outer frame 122 that face each other. Alternatively, the infrared LEDs may be mounted to the outer frame 122 only on the long sides of the outer frame 122 that face each other.

In addition, the transparent transmissive plate 112 supports the display panel 118 and is configured such that the redirected infrared rays can be transmitted without loss. Furthermore, the transparent transmissive plate 112 prevents the display panel 118 from bending by pressure caused by the touch applied to the light guide panel 124. The spacer 126 is also formed between the transparent transmissive plate 112 and the light guide panel 124 to maintain a predetermined gap between the plate 112 and panel 124.

In addition, as shown in FIG. 1, the touch flat display module also includes a backlight unit 100, which includes the bottom cover 102, the light sources 104, the image sensors 106, a flat reflection plate 103 and a plurality of optical sheets 108. Further, the bottom cover 102 receives the light sources 104, the image sensors 106, and the reflection plate 103 which reflects light emitted from the light source 104 toward the optical sheets 108. The bottom cover 102 may be formed of a material having a high thermal conductivity so that heat generated at the light source 104 is efficiently emitted to the outside.

Figure 2:
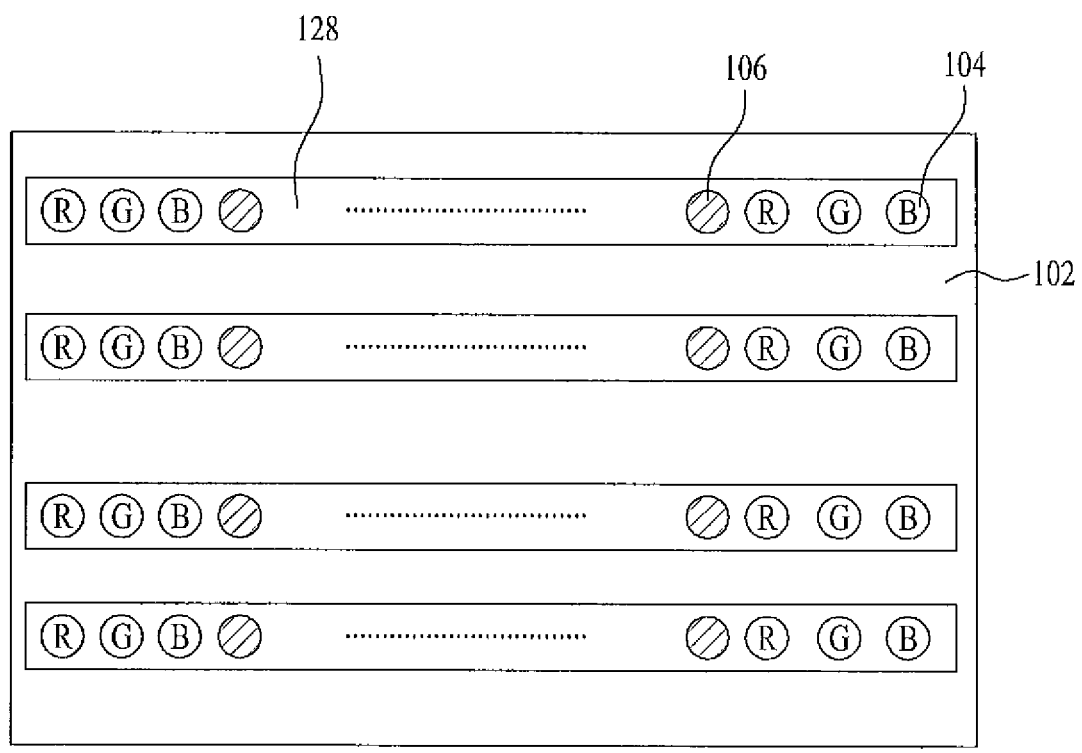
FIG. 2 is an overview illustrating an arrangement of an image sensor and a light source of a multi touch flat display module according to an embodiment of the present invention.

Further, as shown in FIG. 2, the plurality of light sources 104 are linearly arranged on an upper surface of the bottom cover 102, and are modularized and mounted to a circuit board 128. The light sources 104 generate light by being supplied with voltage from an inverter (not shown), and radiates the light upward to the display panel 118.

In addition, the light emitted by the light sources 104 has a wavelength of visible light without infrared rays so as not to interfere with the infrared rays being transmitted through the display panel 118. As shown in FIG. 2, the light sources 104 include, for example, LEDs emitting white light or red (R), green (G) and blue (B) LEDs.

The light sources 104 include, for example, fluorescent lamps, and more specifically, any one of cold cathode fluorescent lamps (CCFL), hot cathode fluorescent lamps (HCFL) and external electrode fluorescent lamps (EEFL). The light sources 104 may also include an interception filter of infrared rays so as not to interfere with the infrared rays being transmitted through the display panel 118. When the light sources are LEDs, the interception filter may be omitted.

Thus, as shown in the embodiment in FIG. 1, the infrared rays emitted by the LEDs 120 are redirected by the FTIR caused when the user touches the light guide panel 124 and transmitted through the display panel 118. In another embodiment, infrared rays detectors or infrared rays cameras may also be used instead of the image sensors 106.

Figure 4:
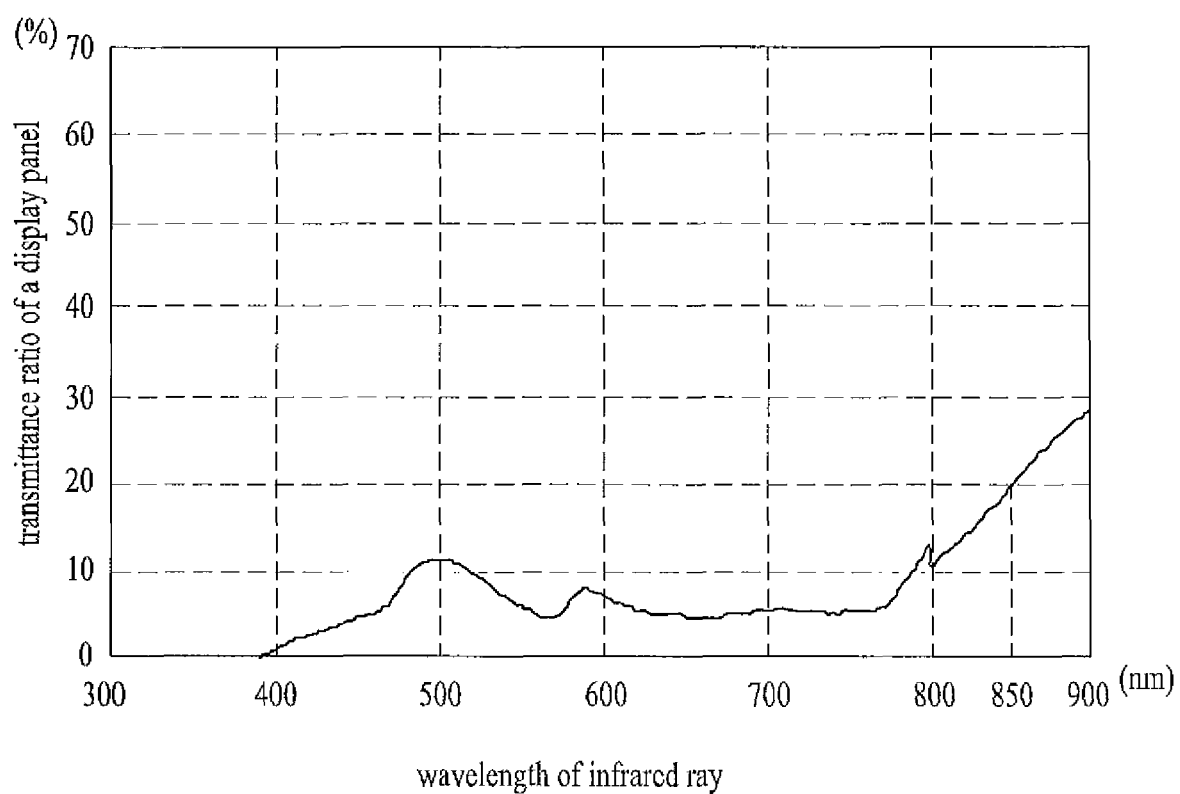
FIG. 4 is a graph illustrating a transmittance of infrared rays of a multi touch flat display module according to an embodiment of the present invention.

Next, FIG. 4 is a graph showing the transmittance of infrared rays of the multi touch flat display module according to an embodiment of the present invention. As shown in FIG. 4, the transmittance of the infrared LEDs 120 using a wavelength greater than 850 nm, that is, the wavelength of an infrared ray, is higher than the transmittance of the display panel 118 using a 400 nm-700 nm wavelength, that is, the wavelength of visible light.

Accordingly, the advancing directions of the infrared rays from the infrared LEDs 120 having greater than 850 nm wavelength are converted by the FTIR of the light guide panel 124, and therefore when the infrared rays are transmitted through the display panel 118, the transmittance of the infrared rays is 20% or more such that the image sensors 106 can detect the infrared rays.

Further, with reference to FIGS. 1 and 2, the reflection plate 103 covers the whole circuit board 128 where the light sources 104 and the image sensors 106 are mounted. Also, the reflection plate 103 is configured such that the light sources 104 emit light through light source holes (not shown) formed through the flat reflection plate 103, and the image sensors 106 receiving the infrared rays protrude upward (see FIG. 1).

In addition, the reflection plate 103 is configured such that the light emitted from the light sources 104, which are point light sources arranged at uniform intervals, can be widely diffused. Also, the plurality of optical sheets 108 radiate light from the light sources 104 and light reflected from the reflection plate 103 to the display panel 118.

For this purpose, the optical sheets 108 preferably include at least one diffusion sheet for diffusing the light from the light sources 104 in all directions, and at least one prism sheet for focusing the light diffused by the diffusion sheet. The lamination structure of the diffusion sheet and the prism sheet may have a sequential, non-sequential or alternate lamination order so as to improve the brightness and uniformity of the light.

In addition, as shown in FIG. 1, the side frame 110 is mounted between the transparent transmissive plate 112 and the bottom cover 102 so as to support the transparent transmissive plate 112. More specifically, the side frame 110 has a predetermined height to increase an emitted angle of the infrared rays emitted from the infrared LEDs 120 and passed downward through the display panel 110 when the light guide panel 124 is touched.

Figure 7:
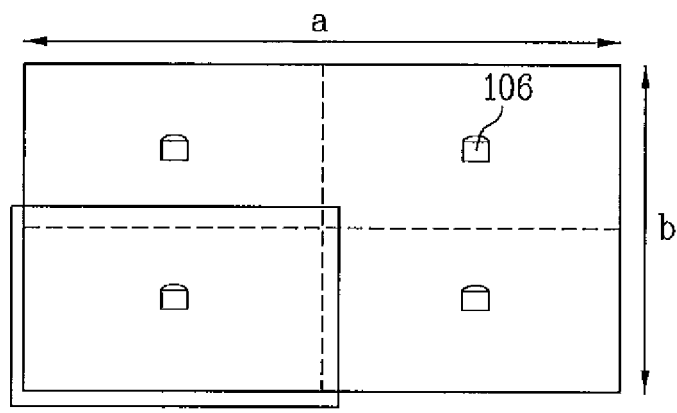
FIGS. 7(a)-(c) are overviews illustrating a determination of a height "c" between a light guide plate and a corresponding image sensor according to an embodiment of the present invention.
Figure 7:
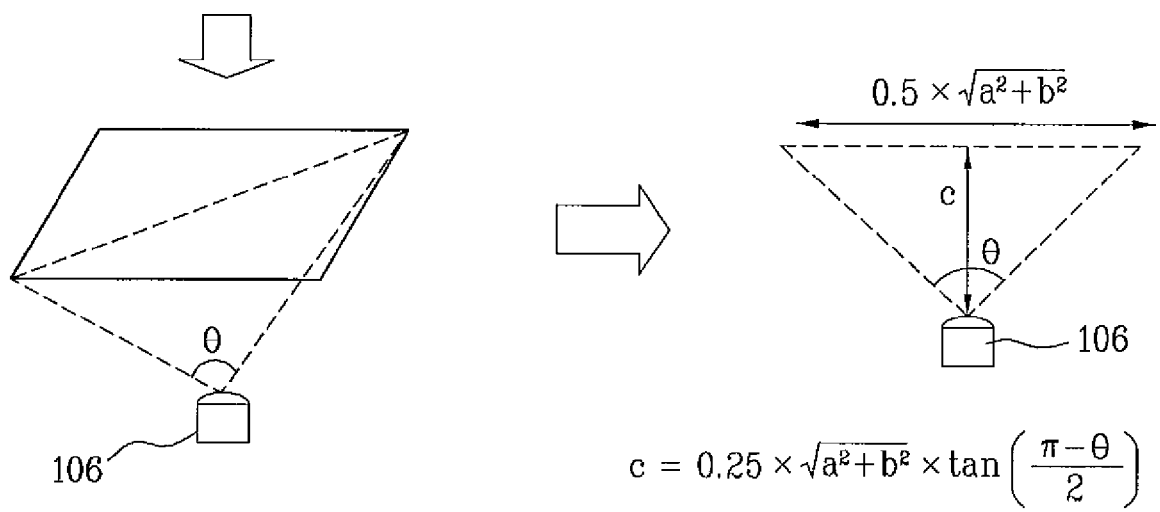

In addition, the height of the side frame 110 is determined such that the image sensors 106 can detect the infrared rays of the infrared LEDs 120 being redirected due to the light guide panel 124 being touched. As shown in FIGS. 7(a)-(c), the height of the side frame 110 depends on a size of the display panel 118 (FIG. 1) and a sensing angel θ of each image sensor 106.

In more detail, in FIG. 7(a), "a" is a horizontal length of a display area of the display panel 118, and "b" is a vertical length of the display area of the display panel 118. In FIG. 7(c), "c" is a distance between the light guide plate 124 and a corresponding image sensor 106. FIG. 7(b) illustrates that the angle θ is a sensing angel of each image sensor 106.

Further, the height c between the light guide plate 124 and the corresponding image sensor 106 includes a thickness of the display panel 118, a thickness of the transparent transmissive plate 112, a height of the side frame 110, and a distance between the side frame 110 and the image sensor 106. For example, when four image sensors 106 are used, the distance c between the light guide plate 124 and the image sensor 106 is determined by the following numerical formula:

$$c = 0.25 \times \sqrt{a^2 + b^2} \times \tan\left(\frac{\pi - \theta}{2}\right)$$

Figure 8:
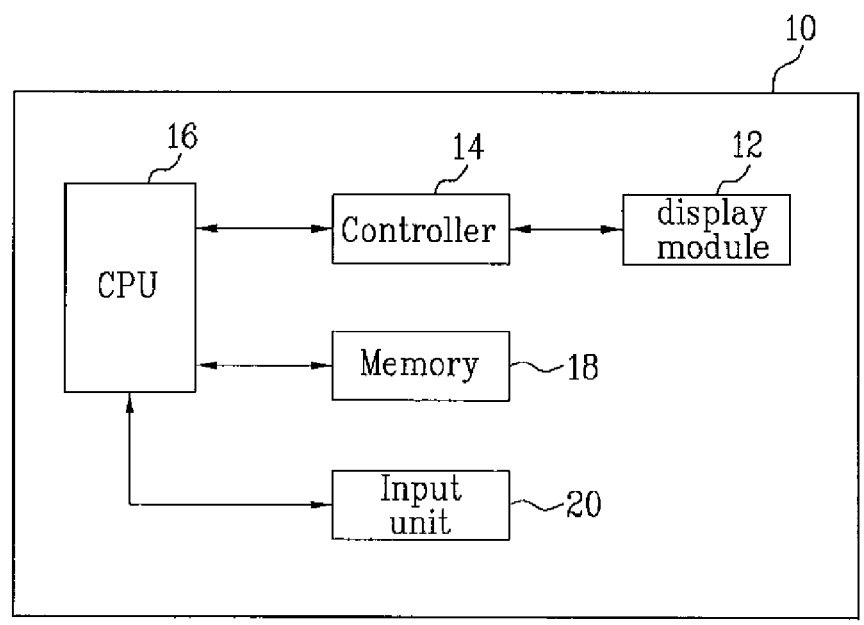
FIG. 8 is a block diagram illustrating an electronic device including a touch flat display module according to an embodiment of the present invention.

Next, FIG. 8 is a block diagram of an electronic device 10 including a flat display module 12 according to an embodiment of the present invention. The flat display module 12 corresponds to the flat display module discussed above with respect to FIGS. 1-7. Further, the electronic device 10 can be a mobile terminal, a navigation device installed in a vehicle or mobile terminal, a PDA, a laptop or other computer, a kiosk or bank machine and any other type of device using the flat display module to input information by touching the screen surface of the flat panel display module.

As shown in FIG. 8, the electronic device 10 includes a display module controller 14 for controlling the flat display module 10, a central processing unit 16 for controlling the overall operations of the electronic device 10, a memory 18 for storing data and other information input or used in an operation of the electronic device 10, and an input unit 20 for inputting information into the electronic device 10.

The input unit 20 may be a keypad, wheel, dial, or any other of input that is not handled by the flat display module 12. That is, the flat display module 12 receives input and other instructions from the user by the user touching the screen of the flat display module 12. Alternatively, the input unit 20 can include, for example, a power on/off key that the user can press to turn on and initialize the electronic device 10, a volume adjustment key, etc. When the display module 12 includes all input operations needed to operate the device 10, the input unit 20 can be omitted.

Further, the display module controller 14 controls the operations of the flat display module 12. For example, the display module controller 14 can determine when the user has touched the display module 12 based on signals received from the image sensors 106. That is, as discussed above, the image sensors 106 detect the infrared rays from the infrared LEDs 120.

In more detail, and as shown in the embodiment in FIG. 1, the infrared rays emitted by the LEDs 120 are redirected by the FTIR caused when the user touches the light guide panel 124 and transmitted through the display panel 118. Thus, the controller 14 can use signals received from the image sensors 106 to determine the location (coordinates) of the position on the display module 12 the user has touched.

The operations of the controller 14 in determining multiple touched positions on the touch panel 124 will now be explained in more detail with reference to FIGS. 9-11C.

Figure 9:
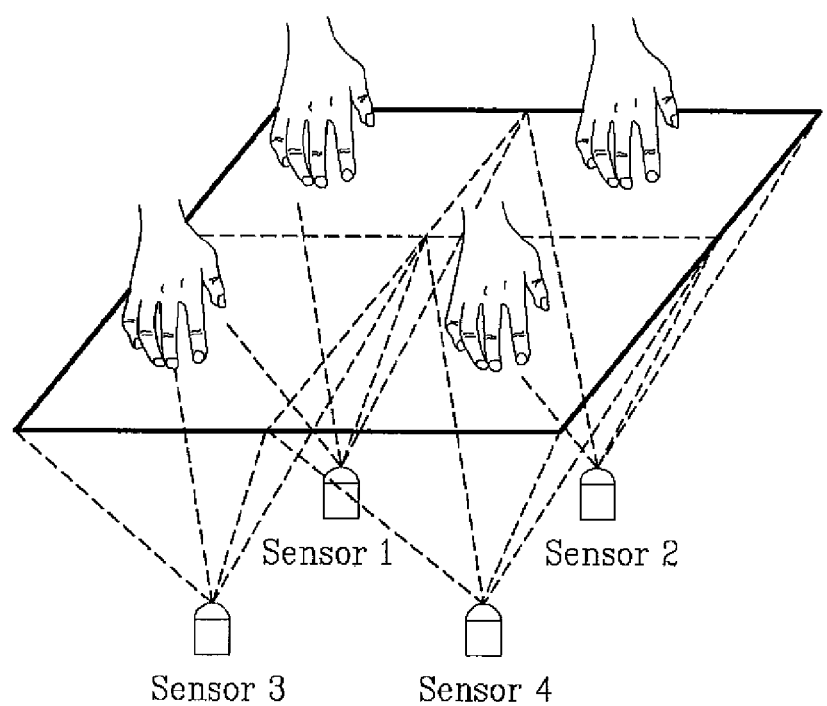
FIG. 9 is an overview illustrating an arrangement of image sensors according to an embodiment of the present invention.

In more detail, FIG. 9 is an overview of a touch panel according to an embodiment of the present including four (4) image sensors disposed below the touch panel (FIG. 1 illustrates an example of such a touch panel). Further, in this embodiment, the number of image sensors is fixed at four (4).

Figure 10:
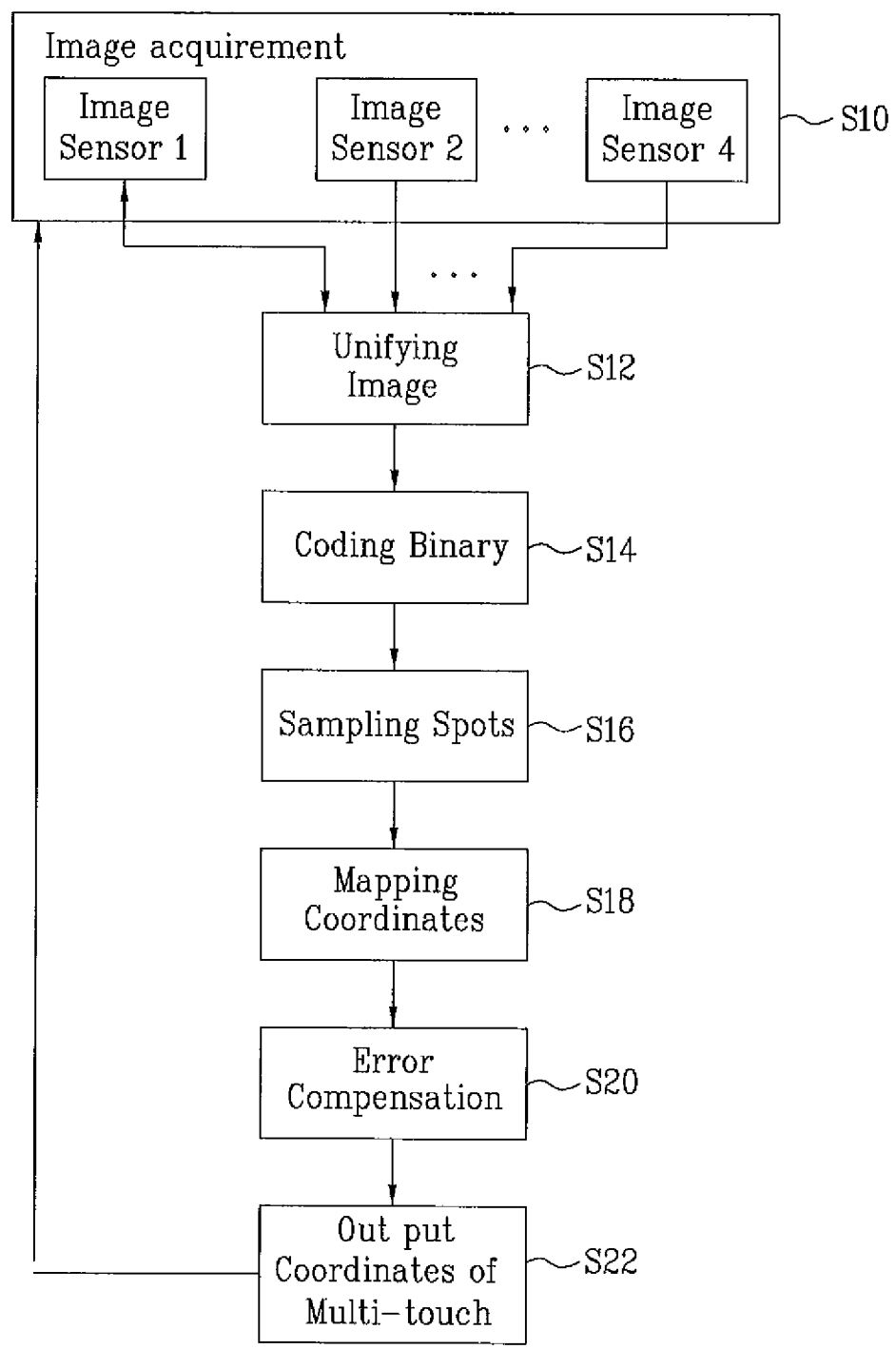
FIG. 10 is a flowchart illustrating a method of determining multiple positions touched on a touch flat display module according to an embodiment of the present invention.

Next, FIG. 10 is a flowchart illustrating the operations of the control unit for determining multiple touched position on the touch panel for the situation shown in FIG. 9. As shown in FIG. 10, the image sensors 14 acquire image information regarding the user touching the touch panel (S10), and the controller 14 unifies the image information received from the image sensors.

Figure 11A:
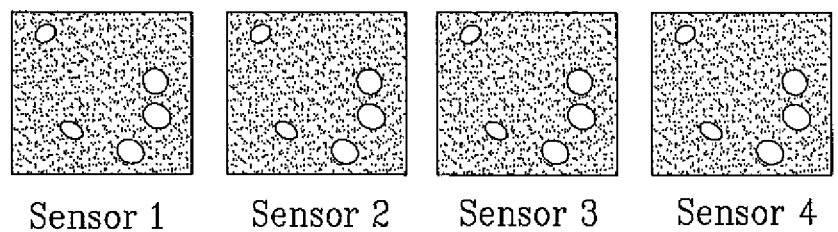
FIGS. 11A-11C are overviews illustrating the method of determining multiple positions touched on a touch flat display module according to an embodiment of the present invention.

For example, FIG. 11A illustrates captured or acquired information for multiple touched positions on the touch panel for each of the image sensors. In this example, the user has touched each section of the touch panel corresponding to an image sensor with all five fingers. Thus, each sensor captures five (5) touched positions on the touch panel.

Figure 11B:
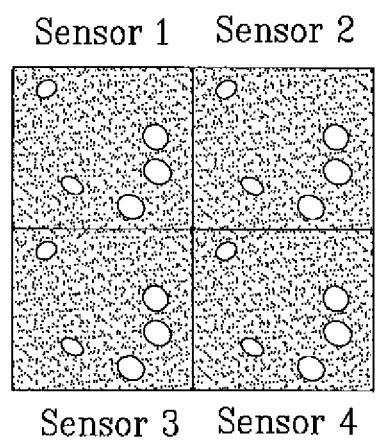
Figure 11C:
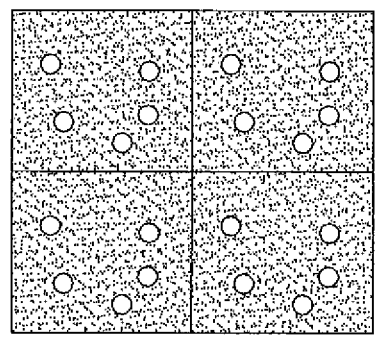

The controller 14 then unifies the images for each of the sensors as shown in FIG. 11B. The controller 14 also converts the unified images into binary values (S14) and determines the touched positions via sampling the data (S15). FIG. 11C illustrates a unified image including touché spots on the touch panel.

Then, in FIG. 10, the controller maps coordinates of the touched spots in FIG. 11C with a coordinate map of the touch panel. (S18) For example, the coordinate map of the touch panel can be predetermined and then used to determine where the touched spots in the information shown in FIG. 11C are on the actual touch panel. The controller 14 can also perform error processing to determine the closest coordinate that applies to the touch spot (S20). The controller 14 then outputs the determined coordinates or uses the determined coordinates to execute a particular function that correspond the determined coordinates. Thus, the controller 14 is advantageously able to determine multiple touched positions on the touch panel according to embodiments of the present invention.

As apparent from the above description, the present invention provides several advantages. For example, the controller can accurately determine the position touched on the display module. The controller can also determine when the user has simultaneously touched multiple positions on the panel, because the image sensors which receive infrared rays emitted from infrared LEDs are mounted to a backlight unit where light sources are mounted. That is, the controller can detect touched positions because the sensors 106 detect the infrared rays through frustrated total reflection of the infrared LEDs, thereby measuring accurate coordinate position values and recognizing the spots corresponding to the coordinate values.

Further, the touch panel can advantageously use a display panel such as a liquid crystal display panel, etc. when the wavelength is selected so the infrared rays can be transmitted through the display panel. This increases the functionality of the touch panel and reduces the overall costs of the touch panel.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display module, comprising:
a touch panel configured to be touched so as to input information;
a liquid crystal display panel disposed below the touch panel and configured to display the information to be touched on the touch panel;
a plurality of infrared emitting light units configured to emit infrared light formed in at least two sides of the touch panel;
a plurality of image sensors disposed below the liquid crystal display panel and configured to detect infrared rays redirected through the liquid crystal display panel towards the image sensors based on a touching of the touch panel;
a controller configured to determine a portion of the touch panel that is touched based on signals received from the plurality of image sensors;
a transparent transmissive plate supporting the liquid crystal display panel at an upper part of a side frame;
an outer frame formed along an outer circumference of the touch panel to fix the plurality of infrared emitting light units;
a spacer maintaining a gap for the liquid crystal display panel between a light guide panel and the transparent transmissive plate, said light guide panel configured to guide infrared light emitted by the plurality of infrared emitting light units; and
a backlight unit including a cover, a circuit board, a flat reflection plate, and a plurality of flat optical sheets, the cover housing a plurality of visible light sources connected to the circuit board, the plurality of visible light sources being configured to emit visible light towards the touch panel, the flat reflection plate being positioned above the circuit board so as to not be in contact with the circuit board, the plurality of flat optical sheets being positioned above the flat reflection plate so as to not be in contact with the flat reflection plate,
wherein a surface of the flat reflection plate and a surface of each the plurality of flat optical sheets are in parallel to a surface of the circuit board,
wherein each of the plurality of image sensors and the plurality of visible light sources are directly connected to the circuit board, each of the plurality of visible light sources extend through the flat reflection plate to emit light through the flat reflection plate and the plurality of flat optical sheets, and each of the plurality of image sensors extend through the flat reflection plate to detect infrared rays emitted by the plurality of infrared emitting light units,
wherein the transparent transmissive plate is configured such that the redirected infrared rays are all transmitted substantially without loss,
wherein corresponding infrared emitting light units included in the plurality of infrared emitting light units disposed in the at least two sides of the touch panel face each other and have a same cross-sectional center axis,
wherein the plurality of infrared emitting light units emit infrared rays from one long side and one short side of the outer frame to the inside of the light guide panel so as to enable detection of spots touched,
wherein the transmittance of the liquid crystal display panel is a wavelength of visible light of 460 nm~700 nm, and the infrared rays of the plurality of infrared emitting light units have a wavelength greater than 850 nm,
wherein the plurality of image sensors are configured to detect the infrared rays having a wavelength transmitted through the liquid crystal display panel of greater than 20% of the wavelength of the visible light transmitted through the liquid crystal display panel,
wherein a height between the touch panel and the plurality of image sensors extended through the flat reflection plate is determined based on the equation:

$$c = 0.25 \times \sqrt{a^2 + b^2} \times \tan\left(\frac{\pi - \theta}{2}\right),$$

where "a" is a horizontal distance of the liquid crystal panel, "b" is a vertical distance of the liquid crystal, and "θ" is a sensing angle of a corresponding image sensor of the plurality of image sensors, and
wherein the height between the touch panel and the plurality of image sensors extended through the flat reflection plate is determined based on the equation to increase the emitted angle of the infrared light emitted from the plurality of infrared emitting light units and detected by the plurality of image sensors extended through the flat reflection plate.

2. The display module of claim 1, wherein the controller is further configured to determine multiple portions of the touch panel simultaneously touched based on the signals received from the plurality of image sensors.

3. The display module of claim 2, wherein the controller determines the multiple portions of the touch panel simultaneously touched by unifying images captured the image sensors into a single image, converting the single image into binary data, sampling the binary data to determine multiple touched spots, and determining coordinates of the multiple touched portions based on the sampled touched spots.

4. The display module of claim 1, wherein the touch panel is configured to reflect the infrared light emitted by the plurality of infrared emitting light units such that the emitted infrared light are guided within the touch panel, and
wherein the infrared rays emitted by the plurality of infrared emitting light units are reflected towards the plurality of image sensors based on the touching of the touch panel.

5. The display module of claim 1, wherein the transmissive plate is disposed below the liquid crystal display and configured to support the liquid crystal display and the touch panel and to direct the infrared rays towards the image sensors with minimal loss.

6. The display module of claim 1, wherein the plurality of image sensors include only four image sensors, and
wherein the image sensors are symmetrically disposed with respect to the liquid crystal panel and the plurality of visible light sources.

7. The display module of claim 1, further comprising:
an interception filter included with a corresponding image sensor and configured to block light emitted by the visible light sources.

8. The display module of claim 7, wherein the visible light sources are disposed on a same plane as the image sensors, and the visible light sources and the image sensor are disposed below the facing infrared emitting light units such that infrared light reflected by multiple touches on the touch panel reflects towards the visible light sources and the image sensors and visible light from the visible light sources projects upward toward the liquid crystal panel.

9. A method of controlling a touch panel including a liquid crystal display panel disposed below the touch panel, the method comprising:
  displaying information to be touched on the touch panel;
  emitting infrared light formed in at least two sides of the touch panel via a plurality of infrared emitting light units;
  detecting infrared rays redirected through the liquid crystal panel via image sensors disposed below the liquid crystal display panel based on a touching of the touch panel;
  determining a portion of the touch panel that is touched based on signals received from the plurality of image sensors;
  supporting the liquid crystal display panel at an upper part of a side frame using a transparent transmissive plate;
  providing a backlight unit including a cover, a circuit board, a flat reflection plate, and a plurality of flat optical sheets, the cover housing a plurality of light sources connected to the circuit board, the plurality of light sources being configured to emit light towards the touch panel, the flat reflection plate being positioned above the circuit board so as to not be in contact with the circuit board, the plurality of flat optical sheets being positioned above the flat reflection plate so as to not be in contact with the flat reflection plate,
  wherein a surface of the flat reflection plate and a surface of each the plurality of flat optical sheets are in parallel to a surface of the circuit board, and
  wherein each of the plurality of image sensors and the plurality of light sources are directly connected to the circuit board, each of the plurality of light sources extend through the flat reflection plate to emit light through the flat reflection plate and the plurality of flat optical sheets, and each of the plurality of image sensors extend through the flat reflection plate to detect infrared rays emitted by the plurality of infrared emitting light units; and
  maintaining a gap for the liquid crystal display panel between a light guide panel and the transparent transmissive plate using a spacer, said light guide panel guiding infrared light emitted by the infrared emitting light units,
  wherein the transparent transmissive plate is configured such that the redirected infrared rays are all transmitted substantially without loss,
  wherein corresponding infrared emitting light units included in the plurality of infrared emitting light units disposed in the at least two sides of the touch panel face each other and have a same cross-sectional center axis,
  wherein the plurality of infrared emitting light units emit infrared rays from one long side and one short side of a outer frame to the inside of the light guide panel so as to enable detection of spots touched,
  wherein the outer frame is formed along an outer circumference of the touch panel to fix the plurality of infrared emitting light units,
  wherein the transmittance of the liquid crystal display panel is a wavelength of visible light of 460 nm~700 nm, and the infrared rays of the plurality of infrared emitting light units have a wavelength greater than 850 nm,
  wherein the plurality of image sensors are configured to detect the infrared rays having a wavelength transmitted through the liquid crystal display panel of greater than 20% of the wavelength of the visible light transmitted through the liquid crystal display panel,
  wherein a height between the touch panel and the plurality of image sensors extended through the flat reflection plate is determined based on the equation:

$$c = 0.25 \times \sqrt{a^2 + b^2} \times \tan\left(\frac{\pi - \theta}{2}\right),$$

where "a" is a horizontal distance of the liquid crystal panel, "b" is a vertical distance of the liquid crystal, and "θ" is a sensing angle of a corresponding image sensor of the plurality of image sensors, and
  wherein the height between the touch panel and the plurality of image sensors extended through the flat reflection plate is determined based on the equation to increase the emitted angle of the infrared light emitted from the plurality of infrared emitting light units and detected by the plurality of image sensors extended through the flat reflection plate.

10. The method of claim 9, wherein the determining step comprises:
  determining multiple portions of the touch panel simultaneously touched based on the signals received from the plurality of image sensors.

11. The method of claim 10, wherein the step of determining multiple portions of the touch panel simultaneously touched comprises:
  unifying images captured the image sensors into a single image;
  converting the single image into binary data;
  sampling the binary data to determine multiple touched spots; and
  determining coordinates of the multiple touched portions based on the sampled touched spots.

12. The method of claim 9, wherein the visible light sources are disposed on a same plane as the image sensors, and the visible light sources and the image sensors are disposed below the facing infrared emitting light units such that infrared light reflected by multiple touches on the touch panel reflects towards the visible light sources and the image sensors and visible light from the visible light sources projects upward toward the liquid crystal panel.

* * * * *